(12) United States Patent
Wolfeld (10) Patent No.: US 9,413,880 B1
(45) Date of Patent: Aug. 9, 2016

(54) AUTOMATIC FAILOVER FOR PHONE RECORDINGS

(71) Applicant: Cisco Technology, Inc., San Jose, CA (US)

(72) Inventor: Jeffrey A. Wolfeld, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/608,510

(22) Filed: Jan. 29, 2015

(51) Int. Cl.
| H04M 1/24 | (2006.01) |
| H04M 3/08 | (2006.01) |
| H04M 3/22 | (2006.01) |
| H04M 3/42 | (2006.01) |
| H04L 29/06 | (2006.01) |
| H04M 7/00 | (2006.01) |

(52) U.S. Cl.
CPC ....... *H04M 3/42221* (2013.01); *H04L 65/1083* (2013.01); *H04M 3/2254* (2013.01); *H04M 7/0084* (2013.01)

(58) Field of Classification Search
CPC ... H04M 3/2263; H04M 3/42; H04M 3/4234; H04M 7/0069; H04M 7/0084; H04M 3/42221; H04M 3/2281; H04M 3/51; H04M 3/5175; H04M 7/006; H04M 3/12
USPC .......... 379/9, 9.04, 9.05, 14.01, 15.01, 15.05, 379/221.01, 221.03, 221.04, 112.01, 379/112.02, 133, 266.1
See application file for complete search history.

(56) References Cited

U.S. PATENT DOCUMENTS

| 5,933,474 | A  | * | 8/1999  | Kipp      | H04M 3/12    |
|           |    |   |         |           | 370/217      |
| 8,446,920 | B2 | * | 5/2013  | Hillier   | H04M 3/2263  |
|           |    |   |         |           | 370/469      |
| 8,976,954 | B1 | * | 3/2015  | Williams  | H04M 3/42221 |
|           |    |   |         |           | 379/265.01   |
| 9,049,197 | B2 | * | 6/2015  | Lum       | H04L 65/1006 |
| 9,178,998 | B2 | * | 11/2015 | O'Connor  | H04M 3/5175  |
| 2011/0116492 | A1 |   | 5/2011  | Byron et al. | |
| 2012/0060053 | A1 | * | 3/2012  | White     | G06F 11/2025 |
|           |    |   |         |           | 714/6.3      |
| 2013/0163446 | A1 | * | 6/2013  | Kruger    | H04L 43/12   |
|           |    |   |         |           | 370/252      |
| 2015/0006741 | A1 | * | 1/2015  | Narayanan | H04L 69/40   |
|           |    |   |         |           | 709/227      |
| 2015/0133092 | A1 | * | 5/2015  | Shaffer   | H04W 4/16    |
|           |    |   |         |           | 455/414.1    |

* cited by examiner

*Primary Examiner* — Binh Tieu
(74) *Attorney, Agent, or Firm* — Edell, Shapiro & Finnan, LLC (57) ABSTRACT

Techniques that enable automatic failover for media stream (e.g., VoIP call) recording devices or servers are presented. In one embodiment, a technique includes designating, from among a plurality of recording servers in a cluster of recording servers, a home recording node that will record a media stream flowing between a first endpoint and a second endpoint, designating, from the plurality of recording servers, an alternate recording node, providing, from, e.g., the home recording node to the alternate recording node, media stream information sufficient to allow the alternate recording node to take over recording of the media stream in the event the home recording node can no longer record the media stream, detecting that the home recoding node can no longer record the media stream, and causing the media stream to be redirected to the alternate recording node to be recorded thereby.

18 Claims, 4 Drawing Sheets

AUTOMATIC FAILOVER FOR PHONE RECORDINGS

TECHNICAL FIELD

The present disclosure relates to a telecommunications network infrastructure that enables automatic call recording failover for telephone calls or other media streams.

BACKGROUND

Telephone call recording may be desirable for several reasons. For example, call recording may enable voice quality analysis to troubleshoot a network. Call recording can also be helpful for training purposes or to maintain an archive for some period of time for subsequent retrieval. Call recording may still also be desired for legal reasons such as lawful intercept. There are two main types of call recording: call data recording and call content recording. Call data recording includes recording call events such as when a call originated, when and by whom a call is terminated, or if a call is forwarded elsewhere. This type of recording may be based on, e.g., what is known as a call detail record (CDR), which captures the phone number of both the person called and the person calling, along with call events and time-date stamps of when the events occurred. In contrast, call content recording involves recording the actual content (e.g., audio) of the call, i.e., the conversation that takes place. Call content recording may also include call data recording.

Many voice calls are now handled by Voice over Internet Protocol (VoIP), which may use, e.g., Session Initiation Protocol (SIP), to set up and tear down sessions over which calls may take place. In a VoIP call, call content is packetized by call endpoints (having unique IP addresses) and transmitted and received over an electronic digital/packet network. In order to record a given call between two endpoints of a VoIP call, "media forking" may be used. Media forking is the process by which the packetized data is copied or cloned at one call endpoint, or at an intermediate location between the endpoints, and the resulting copied or cloned data may then be sent to a recording server or other recording device. In view of the importance of some call recording, it is often desirable to have a backup recording device available in the event a primary call recording device fails.

DESCRIPTION OF EXAMPLE EMBODIMENTS

Overview

Presented herein are techniques that enable automatic failover for media stream recording devices or servers. The media stream may be, for example, a Voice over Internet Protocol (VoIP) telephone call, video or other forms of data. In one embodiment, a technique includes designating, from among a plurality of recording servers in a cluster of recording servers, a home recording node that will record a media stream flowing between a first endpoint and a second endpoint, designating, from the plurality of recording servers, an alternate recording node, providing, from, e.g., the home recording node to the alternate recording node, media stream information sufficient to allow the alternate recording node to take over recording of the media stream in the event the home recording node can no longer record the media stream, detecting that the home recoding node can no longer record the media stream, and causing the media stream to be redirected to the alternate recording node to be recorded thereby.

Example Embodiments

Session Initiation Protocol, or SIP, makes it possible for two or more parties or endpoints to connect peer-to-peer, rather than through a centralized trunk. In addition to enabling the setting up and tearing down of communication sessions between endpoints for, e.g. a VoIP call, SIP provides for "SIP forking" or, more generally, "media forking" Media forking is the process of splitting, copying or cloning VoIP/SIP call packets (or, more generally, a media stream) and sending the resulting replicated packets of the media stream to one or more termination or endpoints.

Media forking is of particular benefit when it is desired to, for example, record a SIP enabled telephone call between two endpoints. That is, once a communication session is instantiated between two SIP-enabled telephones, one of the telephones can be configured to enable call recording using media forking by replicating the media streams between the call endpoints and sending the replicated streams (incoming and outgoing streams) to a predetermined recording device. In many implementations, however, when a call is recorded via media forking, the media streams(s) flow to a single recording device or server. In the event that single server fails, then all recordings of calls that that server was capturing will be cut short.

As will be explained in connection with embodiments described more fully herein, a process is provided that enables the continuation of call recording on an alternate recording server, after a primary or "home" recording server or node has failed. That is, embodiments described herein provide a failover mechanism for recording servers that are receiving a media stream via media forking, such as that supported by SIP.

Figure 1:
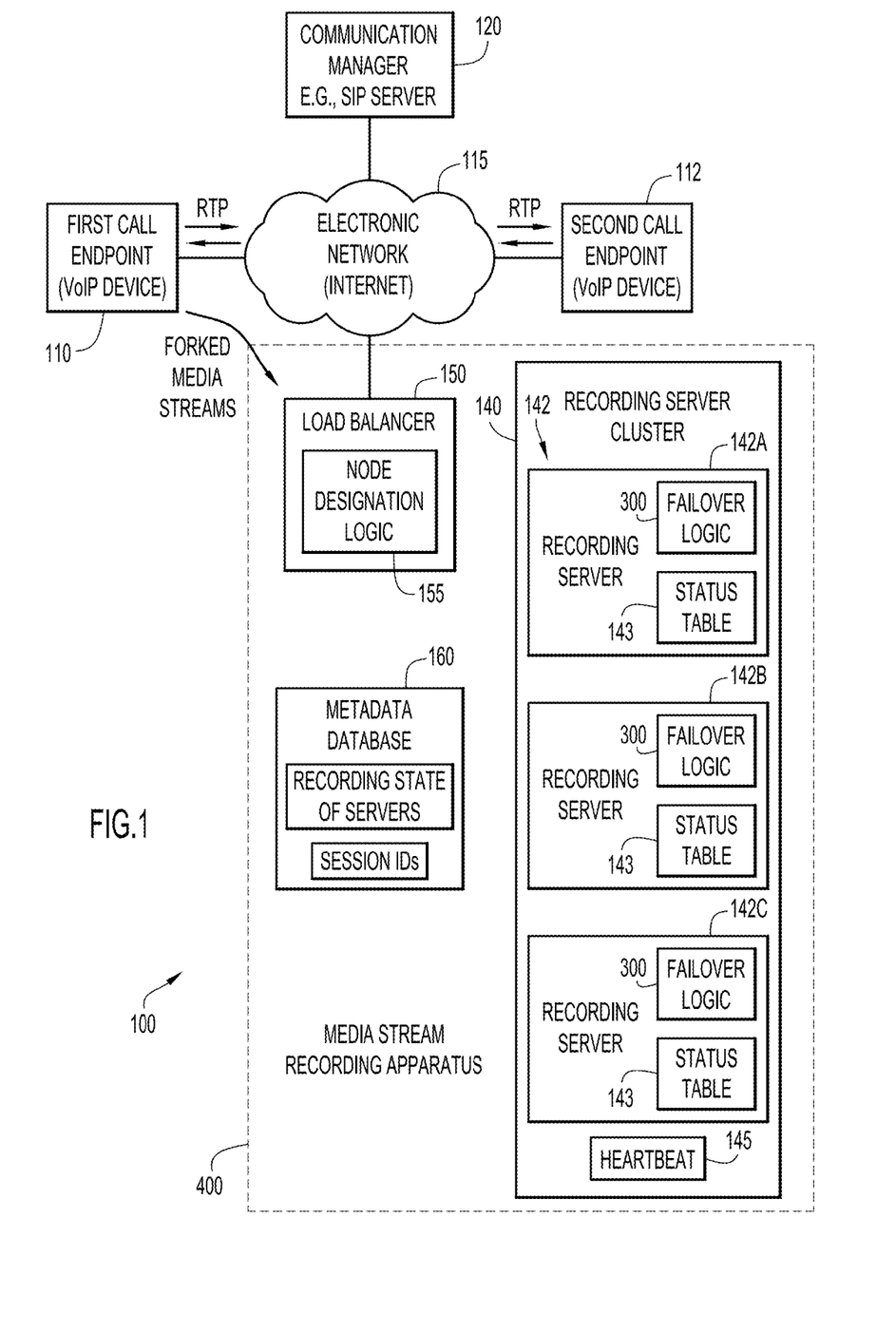
FIG. 1 is a block diagram of components involved in recording a media stream according to an example embodiment.

Reference is made to FIG. 1, which is a block diagram of components of an overall system 100 involved in recording a media stream and implementing recording server failover according to an example embodiment. As shown, a first call endpoint 110 and a second call endpoint 112 are communicatively coupled together via an electronic network 115, such as the Internet. In an embodiment, call endpoints 110, 112 may be SIP/VoIP enabled telephones, computers, laptops, tablets, or any electronic device that can be enabled to support VoIP telephony. In this context, and as shown in FIG. 1, once a call session has been established between endpoints 110, 112, real-time transport protocol (RTP) streams are established between the endpoints 110, 112. Forked RTP streams are directed to a load balancer 150.

Those skilled in the art will appreciate that although the instant description focuses on telephony, the media stream that is recorded need not be limited to audio, but could alternatively or also include other data such as video, among other possibilities. Also, although electronic network 115 is described as being the Internet, any proprietary or public network could also be used to implement the concepts described herein.

Also connected to electronic network 115 are a communication manager 120 and the load balancer 150, that is, itself, in communication with a recording server cluster 140. Communication manager 120 may be implemented as a SIP server and may be employed to support the connectivity between endpoints 110 and 112, as will be explained more fully below.

Recording server cluster 140 comprises a plurality of recording servers 142A, 142B, 142C, which may be referred to herein, generally, as recording servers 142. Each recording server 142 is configured to record or store a media stream that is directed to it via, for example, a unique IP address. That is, each recording server 142 is uniquely accessible via a predetermined or dynamically assignable IP address. Each recording server 142 includes a state table 143 and failover logic 300. State table 143 stores the state of each other recording server 142 in the cluster 140. Thus, for example, state table 143 of recording server 142A stores the operational state of recording servers 142B and 142C. Similarly, state table 143 of recording server 142B stores the operational state of recording servers 142A and 142C, and state table 143 of recording server 142C stores the operational state of recording servers 142A and 142B.

State tables 143 are updated periodically, e.g., on the order of every 40 msec, via a heartbeat process 145 operating within recording server cluster 140. That is, every 40 msec, each recording server 142 is notified of the operational status of every other recording server in the cluster. In this way, each recording server 142 can become aware, very quickly, if a given recording server is no longer operational. This heartbeat feature is particularly helpful in connection with the failover mechanism described more fully below, and which may be embodied, at least partially, in, e.g., failover logic 300, which is provided in each recording server 142.

Also shown in FIG. 1 is metadata database 160, which is configured to maintain metadata regarding recordings being captured by recording servers 142. Such metadata might include, among other things, a recording session identifier for each respective recording stored on the recording servers 142. Once a recording completes, recording-specific operational state records become the historical metadata record of that recording. This recording-specific information includes, e.g., the identity of the recording server which is capturing (or has captured) the recording. Metadata database may also store the operational state of each recording server 142 in addition to or instead of that information being stored on the respective recording servers 142.

Finally, FIG. 1 also depicts node designation logic 155, discussed below, that may be stored in and implemented by load balancer 150. Those skilled in the art will appreciate that node designation logic 155 could also be deployed within cluster 140, implemented as part of metadata database 160 or provided elsewhere as long as the results of the functionality thereof can be made available to recoding servers 142. In one possible implementation, node designation logic 155 is deployed on each recording server 142 and load balancer 150, as it detects a new request for a call recording, selects one of the recording servers to perform the functionality of node designation, as more fully described below.

As further depicted in FIG. 1 by the broken line, the recording server cluster 140, metadata database 160 and load balancer 150 can be collectively referred to as a media stream recording apparatus 400.

At a high level, the embodiments described herein provide for selecting a given recording server for recording a call and designating that recording server as a "home recording node." Thereafter, an alternate recording server is selected as an "alternate recording node." The alternate recording node is designated to take over recording of a call when the home recording node fails. Once the home recording node and the alternate recording node are selected, the home recording node, or metadata database, is configured to supply to the alternate recording node information sufficient to enable the alternate recording node to take over recording responsibility in the event of a failure of the home recording node. Thus, in the event of a failure of the home recording node, the alternate recording node, or metadata database, in conjunction with communication manager 120, or directly with the call endpoint (or other entity) that is conducting media forking, negotiates with that call endpoint (or other entity) to reroute the forked media to the alternate recording node.

Discussed next are operations for designating or selecting a home recording node and an alternate recording node, and then operations upon detection of a failure of a home recording node.

As noted, recording server cluster 140 comprises a plurality of recording servers 142. As configured, any one server in the cluster could in theory record any call that any other server could record. As shown in FIG. 1, forked media streams are first passed to load balancer 150, which distributes the newly arriving recordings among the servers in the cluster using, e.g., a hash of each call's unique identifier, equally distributed across all active servers to select or designate a home recording node. For instance, a function might be constituted as the following hash: HomeNode=Hash(id,listOfActiveNodes). In an embodiment, metadata database 160 keeps track of the recording state of calls. Also, recording metadata is independent from the recording nodes, such that through either redundancy or physical fault isolation, the recording metadata remains accessible even if a home recording node for a given call fails. Further, and as noted, each recording server 142 or node in the cluster 140 is always aware of the active state of all the other nodes in the cluster 140.

When a home recording node, Nh, is assigned a new recording using, e.g., the hash above, an alternate recording node is thereafter determined by executing the same hash algorithm under the hypothetical assumption that Nh is not available. Such a hash may be represented as, e.g., AlternateNode=Hash(id,listOfActiveNodes-Nh). The aforementioned hashes may be performed by node designation logic 155 operating in connection with load balancer 150. As previously mentioned, however, node designation logic 155 can be instantiated anywhere within media stream recording apparatus 400.

Once the alternate recording node is selected, the designated home recording node sends a message to the alternate recording node providing information, e.g., SIP dialog details, about the call that is being recorded that may be employed later if the alternate recording node is needed to take over recording of that call. Also, in one implementation, when the recording ends, the home recording node sends the alternate recording node an indication that the recording has ended. The alternate recording node retains the information during the active life of that recording, and discards it when the alternate recording node is notified that the recording has terminated normally.

Whenever the alternate recording node for a given call detects that the home recording node for that call has failed (by, e.g., monitoring state table 143 or by notification from metadata database 160, which itself might have access to the respective operational states of the recording servers), the alternate recording node starts its own new recording session using the previously delivered call details previously supplied from the call's home recording node by sending, e.g., an INVITE with REPLACE command to the media forking device (or its SIP-based controlling device), making no changes in the session description protocol (SDP), but redirecting the media to its own IP address and port numbers. The forking device then continues to send its forked media to the alternate recording node. Finally the alternate recording node updates the shared metadata database to indicate that the predecessor recording session was terminated prematurely, and has been continued on the alternate node.

Detecting that a home recording node has failed and triggering the INVITE with REPLACE command may be performed by failover logic 300. That is, failover logic 300 may be configured to monitor state table 143 and, when it is determined that the state of a paired home recording node has become non-operational, is further configured to itself send the INVITE with REPLACE command on behalf of the alternate recording node, trigger a call endpoint that is performing media forking to send the INVITE with REPLACE command, or trigger an intermediate device, such as communication manager 120 to send the INVITE with REPLACE command on behalf of the alternate recording node.

Note that when an alternate recording node begins recording it effectively becomes a home recording node. Accordingly, node designation logic 155 may again be invoked to select yet another alternate recording node, but this time to designate an alternate to the original alternate. In this selection process, the hash function used would exclude the now-failed original home recording node and the originally selected alternate home node, which has now actively taken over recoding responsibilities.

In accordance with embodiments described herein, several things occur after a recording node has failed. First, and significantly, all recordings continue to completion, although they are now divided into two (or more) segments: one on the home recording node and one (or more) on the alternate recording node(s).

Second, the metadata database 160 contains records for each segment of the recording, such that an application searching that database can locate each segment because each contains the same call identifying information, e.g., the same call session ID. Individual segments can then be stringed together to obtain the entirety of the recording.

Finally, the amount of lost recording during failover is very small. Specifically, the lost time is substantially equal to the summation of the time it takes for the alternate recoding node to detect home recording node failure (which may be no longer than 40 msec), plus the time it takes to complete the SIP REINVITE with REPLACE. Thus, the total time that might be lost may be on the order of less than a quarter of a second.

In accordance with the embodiments described herein, the alternate recording node may be assigned on a call by call basis, not a node by node basis, which is the case in a round-robin node failover scheme. As a result, recordings from a failed node may be distributed evenly across all the remaining nodes, and this approach can avoid having only a single backup node to take on the entire load from the failed node, in addition to any load it is already carrying for itself. Consequently, the recording server cluster 140 can be deployed with "N+M" (with M being less than N) redundancy rather than "2N" redundancy, avoiding the wasted capacity that 2N redundancy entails.

The SIP-based controller for the media forking device (e.g., one of the endpoints 110, 112 or communication manager 120) is preferably configured to support media stream redirection as directed by a SIP redirect coming from a node which was not a party to the original SIP dialog. That is, the original recording session dialog transpired between the call controller and the home recording node, but the REINVITE dialog will come from the alternate recording node (or a proxy therefor). Such functionality is supported by, for example, the Cisco Unified Communications Manager available from CISCO™, San Jose, Calif.

It is noted that the methodology for selecting the alternate recording node is not critical. That selection process need not be the same or even similar to the original home recording node selection process. Nevertheless, a goal of the alternate recording node selection process is to effect a substantially even distribution of assignments to the remaining nodes in the recording server cluster 140. Thus, the node designation logic 155 for selecting an alternate node could be a relatively simple random number generator. However, to achieve minimal possible lost recording time, it is desirable to select the alternate recording node for a given call at the start of that call recording session, not at call recovery time. Early selection of the alternate recording node avoids a possibly critical delay at a point when media is actually being lost, while the potential alternate recording nodes negotiate with one another.

Figure 2:
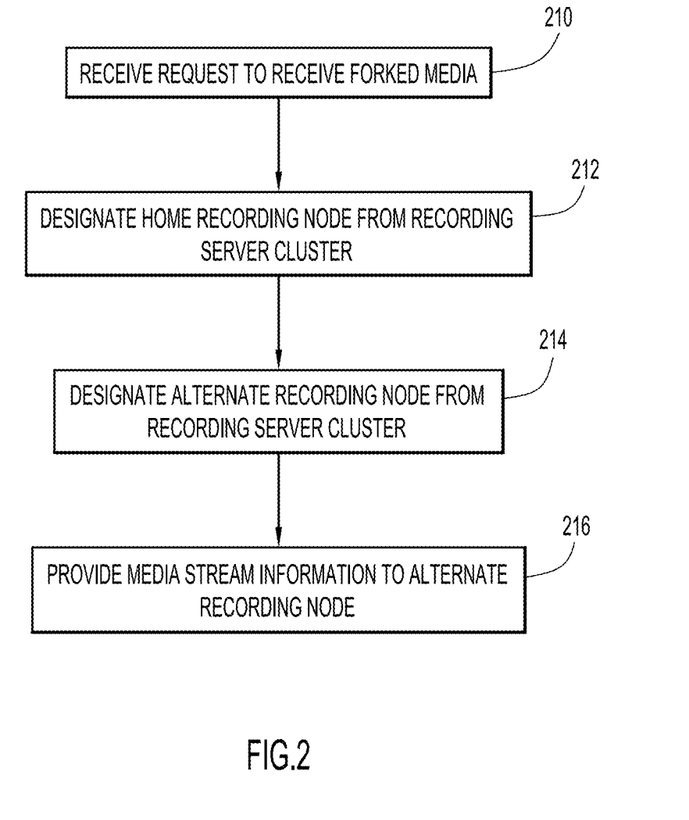
FIG. 2 is an example flow chart depicting a series of operations for implementing an example embodiment.

Reference is now made to FIG. 2 which depicts a series of operations that are performed in selecting a home recording node and an alternate recording node. At 210, a request is received to receive forked media. This request may be received at load balancer 150. The request may have been generated by a call endpoint or by, e.g., communication manager 120. At 212, a home recording node is designated or selected from among the recording servers in a cluster of recording servers. This selection or designation process may be performed by, e.g., node designation logic 155 using a hash function as mentioned above. Once a home recording node is selected, at 214, an alternate recording node is selected or designated from among the remaining recording servers in the cluster of recording servers. The alternate recording node can be similarly selected using a hash function. Then, at 216, the designated home recording node provides media stream information (e.g., SIP dialog, session description information, etc.) to the alternate recording node sufficient for the alternate recording node to take over recording responsibilities upon a failure of the home recording node.

Figure 3:
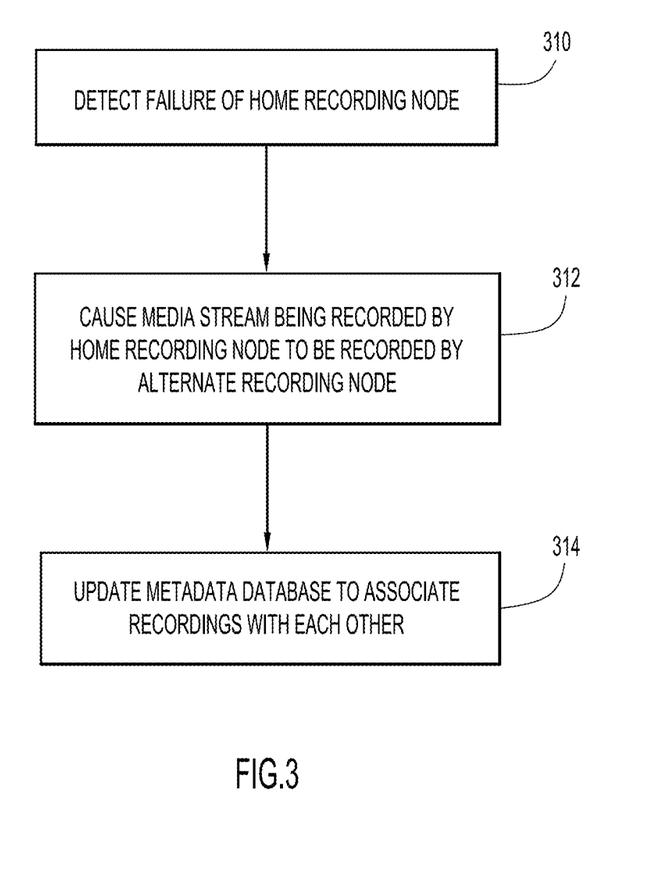
FIG. 3 is an example flow chart depicting a series of operations for implementing an example embodiment.

FIG. 3 depicts a series of operations that are performed in connection with a failure of the designated home recording node. Specifically, at 310, a failure of the home recording node is detected. Such detection may be performed by monitoring a state table that is updated with the operational state of each recording server in a cluster of recording servers. The state table may be disposed in each of the recording servers 142, and/or in metadata database 160, among other possible locations. At 312, the media stream that was being directed to the now-failed home recording node is caused to be redirected to the alternate recording node. Such redirection may be caused by the alternate recording server, a communication manager, or some other entity sending an INVITE with REPLACE command to the media forking device. Such a command will maintain call details but will replace the original IP address and port associated with now-failed home recording node, with the IP address and port of the alternate recording server. At 314, the metadata database is updated to ensure that the segment of the recording that was recorded on the home recording node and the segment of the recording that was recorded on the alternate recording node are associated with each other through a common call session ID, for example. That is, the metadata database is notified by, e.g., the alternate recording node, that a continuation of a recording of the media stream begun on the home recording node continues on the alternate recording node.

Figure 4:
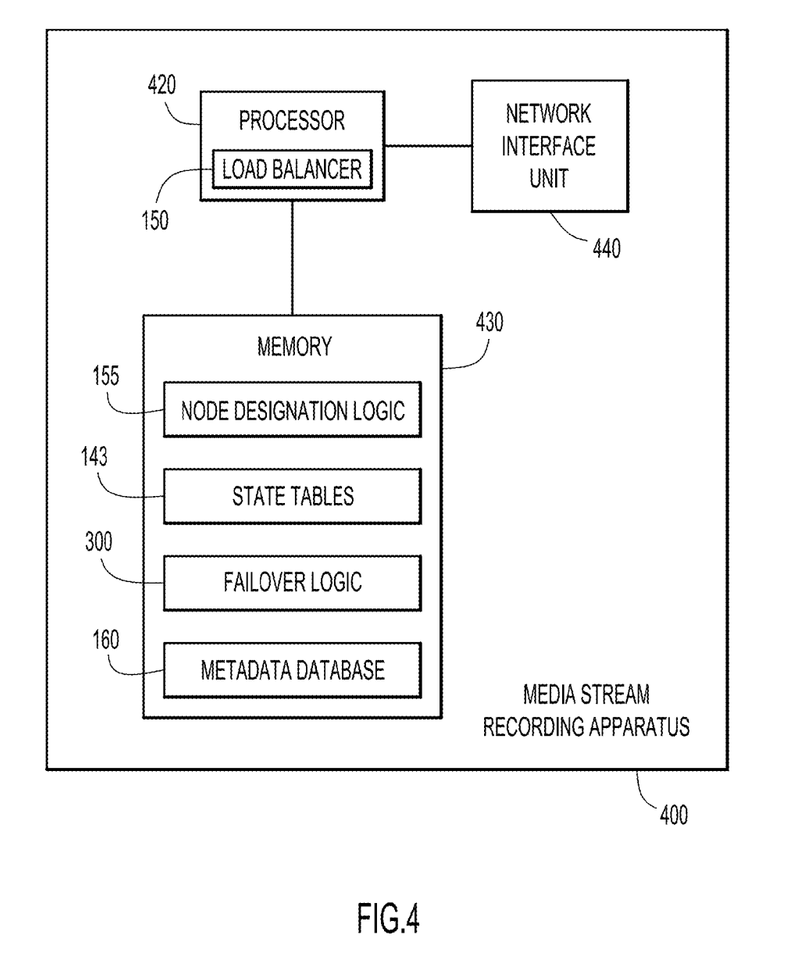
FIG. 4 is a block diagram of a media stream recording apparatus according to an example embodiment.

FIG. 4 is a block diagram of media stream apparatus 400 according to an example embodiment. Media stream apparatus 400 includes a processor 420, memory 430 and a network interface unit 440. Processor 420 may be configured to perform the functions of, e.g., load balancer 150, heartbeat process 145, node designation logic 155, and failover logic 300, among other functions. Memory 430 is configured to store a variety of data and software instructions including node designation logic 155, state table 143, failover logic 300 and data associated with metadata database 160. Network interface unit 440 may include one or more ports or network interface cards via which media stream recording apparatus 400 can communicate with a network such as electronic network 115.

Processor 420 may be, for example, a microprocessor or microcontroller that executes instructions for implementing the processes described herein. Memory 430 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, memory 430 may comprise one or more tangible (non-transitory) computer readable storage media (e.g., a memory device) encoded with software comprising computer executable instructions and when the software is executed (by processor 420) is operable to perform the operations described herein.

Thus, to summarize, in a cluster of recording nodes, each call to be recorded is assigned both a home node (where the recording normally takes place) and an alternate node. Alternate nodes are distributed across the cluster on a call-by-call basis rather than a node-by-node basis. When an alternate node detects a home node failure, the alternate node takes over all the active recording sessions by issuing, e.g., a SIP REINVITE with REPLACE command to the media forking device, and updates the shared metadata database to reflect recording sessions split across two nodes (or more).

Several advantages are achieved by way of the embodiments described herein. For example, calls do not need to be redundantly recorded in order for them to be reliable in the face of a single-node failure. This has the effect of saving up to half the disk space (an expensive resource in the call recording industry, especially when considering video or omnichannel recording). The described embodiments also have the effect of avoiding having to implement a background task to detect and delete redundant recordings once they are determined to have been successfully captured. The instant embodiments dynamically react to failures and thus it is likely that there would be no duplicate recordings to identify and delete.

Deployment only requires N+M (with M being less than N) redundant equipment rather than 2N, since calls from the failed node will be evenly distributed across all remaining active nodes There is no expectation that a failed node needs to perform any active recovery or cleanup, either during some sort of partially in-service operation or after it returns to full service.

It is noted that the device performing media forking need not necessarily be one of the endpoints of a call session. Rather, media forking for purposes of the embodiments describe herein may be performed by an intermediate server (e.g., communication manager 120) or a gateway device (not shown, and which may be beneficial for media streams extending beyond an enterprise boundary).

Thus, in accordance with the described embodiments, a method and an apparatus for performing the method are provided. The method includes designating, from among a plurality of recording servers in a cluster of recording servers, a home recording node that will record a media stream flowing between a first endpoint and a second endpoint; designating, from the plurality of recording servers, an alternate recording node; providing, from the home recording node to the alternate recording node, media stream information sufficient to allow the alternate recording node to take over recording of the media stream in the event the home recording node can no longer record the media stream; detecting that the home recoding node can no longer record the media stream; and causing the media stream to be redirected to the alternate recording node to be recorded thereby The method further includes designating the alternate recording node by selecting from among the plurality of recording servers except for the home recording node.

The method still further provides that a session that enables the media stream to flow between the first endpoint and the second endpoint is instantiated using the Session Initiation Protocol (SIP), and the media stream information sufficient to allow the alternate recording node to take over recording of the media stream in the event the home recording node can no longer record the media stream comprises SIP dialog details of the session.

In an effort to reduce the amount of lost recording time, the SIP dialog details of the session are provided to the alternate recording node at substantially the same time that the session is instantiated.

To detect, by the alternate recording node, that the home recoding node can no longer record the media stream, the method may include monitoring a heartbeat signal that is received by each of the recording servers in the cluster of recording servers To cause the media stream to be redirected to the alternate recording node the method may encompass sending an INVITE-REPLACE message from the alternate recording node to one of the first endpoint and the second endpoint.

The method still further includes assigning a session identifier to the media stream, and associating the session identifier with a recording of a first portion of the media stream stored on the home recording node, and associating the session identifier with a recording of a second portion of the media stream stored on the alternate recording node.

In an embodiment, the alternate recording node updates a metadata database with information indicative that a continuation of a recording of the media stream begun on the home recording node continues on the alternate recording node.

The above description is intended by way of example only. Various modifications and structural changes may be made therein without departing from the scope of the concepts described herein and within the scope and range of equivalents of the claims.

What is claimed is:
1. A method comprising:
designating, from among a plurality of recording servers in a cluster of recording servers, a home recording node that will record a media stream flowing between a first endpoint and a second endpoint;
designating, from the plurality of recording servers, an alternate recording node;
providing, from the home recording node to the alternate recording node, media stream information sufficient to allow the alternate recording node to take over recording of the media stream in the event the home recording node can no longer record the media stream;
detecting that the home recoding node can no longer record the media stream;

causing the media stream to be redirected to the alternate recording node to be recorded thereby; and notify a metadata database that a continuation of a recording of the media stream begun on the home recording node continues on the alternate recording node.

2. The method of claim 1, wherein designating the alternate recording node comprises selecting from among the plurality of recording servers except for the home recording node.

3. The method of claim 1, wherein a session that enables the media stream to flow between the first endpoint and the second endpoint is instantiated using the Session Initiation Protocol (SIP), and wherein the media stream information sufficient to allow the alternate recording node to take over recording of the media stream in the event the home recording node can no longer record the media stream comprises SIP dialog details of the session.

4. The method of claim 3, wherein the SIP dialog details of the session are provided to the alternate recording node at substantially the same time that the session is instantiated.

5. The method of claim 1, wherein detecting, by the alternate recording node, that the home recoding node can no longer record the media stream comprises monitoring a heartbeat signal that is received by each of the recording servers in the cluster of recording servers.

6. The method of claim 1, wherein causing the media stream to be redirected to the alternate recording node comprises sending an INVITE-REPLACE message in accordance with the Session Initiation Protocol (SIP).

7. The method of claim 1, further comprising assigning a session identifier to the media stream, and associating the session identifier with a recording of a first portion of the media stream stored on the home recording node, and associating the session identifier with a recording of a second portion of the media stream stored on the alternate recording node.

8. The method of claim 1, wherein the alternate recording node notifies the metadata database that a continuation of a recording of the media stream begun on the home recording node continues on the alternate recording node.

9. The method of claim 1, further comprising notifying the alternate recording node that a recording on the home record node has terminated normally.

10. An apparatus comprising:
a network interface unit configured to enable communications via a network;
a memory configured to store logic instructions; and
a processor, when executing the logic instructions, configured to:
designate, from among a plurality of recording servers in a cluster of recording servers, a home recording node that will record a media stream flowing between a first endpoint and a second endpoint;
designate, from the plurality of recording servers, an alternate recording node;
provide, from the home recording node to the alternate recording node, media stream information sufficient to allow the alternate recording node to take over recording of the media stream in the event the home recording node can no longer record the media stream;
detect that the home recoding node can no longer record the media stream;
cause the media stream to be redirected to the alternate recording node to be recorded thereby; and notify a metadata database that a continuation of a recording of the media stream begun on the home recording node continues on the alternate recording node.

11. The apparatus of claim 10, wherein the processor, when executing the logic instructions, is further configured to:
designate the alternate recording node comprises selecting from among the plurality of recording servers except for the home recording node.

12. The apparatus of claim 10, wherein the processor, when executing the logic instructions, is further configured to:
provide Session Initiation Protocol (SIP) dialog details as at least part of the media stream information sufficient to allow the alternate recording node to take over recording of the media stream in the event the home recording node can no longer record the media stream.

13. The apparatus of claim 12, wherein the processor, when executing the logic instructions, is further configured to:
provide the SIP dialog details to the alternate recording node at substantially the same time that a SIP session between the first endpoint and the second endpoint is instantiated.

14. The apparatus of claim 10, wherein the processor, when executing the logic instructions, is further configured to:
detect, by the alternate recording node, that the home recoding node can no longer record the media stream by monitoring a heartbeat signal that is received by each of the recording servers in the cluster of recording servers.

15. The apparatus of claim 10, wherein the processor, when executing the logic instructions, is further configured to:
cause the media stream to be redirected to the alternate recording node by sending an INVITE-REPLACE message in accordance with the Session Initiation Protocol (SIP).

16. The apparatus of claim 10, wherein the processor, when executing the logic instructions, is further configured to:
assign a session identifier to the media stream, and associate the session identifier with a recording of a first portion of the media stream stored on the home recording node, and associate the session identifier with a recording of a second portion of the media stream stored on the alternate recording node.

17. The apparatus of claim 10, wherein the processor, when executing the logic instructions, is further configured to:
notify the alternate recording node that a recording on the home record node has terminated normally.

18. A non-transitory tangible computer readable storage media encoded with instructions that, when executed by a processor of a network device configured to perform networking resource resolution, cause the processor to:
designate, from among a plurality of recording servers in a cluster of recording servers, a home recording node that will record a media stream flowing between a first endpoint and a second endpoint;
designate, from the plurality of recording servers, an alternate recording node;
provide, from the home recording node to the alternate recording node, media stream information sufficient to allow the alternate recording node to take over recording of the media stream in the event the home recording node can no longer record the media stream;
detect that the home recoding node can no longer record the media stream;
cause the media stream to be redirected to the alternate recording node to be recorded thereby; and notify a metadata database that a continuation of a recording of the media stream begun on the home recording node continues on the alternate recording node.

* * * * *